(12) United States Patent
Kushner

(10) Patent No.: US 11,161,245 B2
(45) Date of Patent: Nov. 2, 2021

(54) SYSTEMS AND METHODS FOR SECURE LOCKER FEEDERS

(71) Applicant: Wells Fargo Bank, N.A., San Francisco, CA (US)

(72) Inventor: Kristine Ing Kushner, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 456 days.

(21) Appl. No.: 16/170,529

(22) Filed: Oct. 25, 2018

(65) Prior Publication Data
US 2020/0130182 A1    Apr. 30, 2020

(51) Int. Cl.
| B25J 9/16 | (2006.01) |
| B25J 13/00 | (2006.01) |
| G07F 19/00 | (2006.01) |

(52) U.S. Cl.
CPC .......... *B25J 9/1664* (2013.01); *B25J 13/006* (2013.01); *G07F 19/203* (2013.01)

(58) Field of Classification Search
USPC ................................................ 700/245–264
See application file for complete search history.

(56) References Cited

U.S. PATENT DOCUMENTS

| 5,163,001 A * | 11/1992 | Luke, Jr. .............. G05D 1/0265 |
| | | 701/23 |
| 6,266,577 B1 * | 7/2001 | Popp ........................ B25J 9/163 |
| | | 700/245 |
| 6,374,155 B1 * | 4/2002 | Wallach ............... G05D 1/0274 |
| | | 700/245 |
| 6,443,359 B1 | 9/2002 | Green et al. |
| 6,543,983 B1 * | 4/2003 | Felder ...................... B23Q 7/10 |
| | | 414/331.07 |
| 6,609,969 B1 | 8/2003 | Luciano et al. |
| 6,636,781 B1 * | 10/2003 | Shen ....................... B08B 9/045 |
| | | 318/568.11 |
| 6,705,523 B1 * | 3/2004 | Stamm ............. G05B 19/41895 |
| | | 235/385 |
| 6,721,776 B1 | 4/2004 | Erickson et al. |
| 6,976,634 B2 | 12/2005 | Washington et al. |
| 7,053,773 B2 | 5/2006 | McGarry et al. |
| 7,725,875 B2 | 5/2010 | Waldrep |

(Continued)

FOREIGN PATENT DOCUMENTS

| WO | WO-2010/085370 | 7/2010 |
| WO | WO-2017/181185 A1 | 10/2017 |

*Primary Examiner* — Jonathan L Sample
(74) *Attorney, Agent, or Firm* — Foley & Lardner LLP

(57) ABSTRACT

Systems and methods for a feeder system for fulfilling lockbox pick-up requests are provided. A feeder system includes a network interface configured to communicate with a computing system associated with a provider of lockbox services and at least one robotic device. Each robotic device includes at least one secure compartment configured to hold one or more items associated with a lockbox pick-up request. The feeder system further includes a processing circuit including a processor and a memory. The memory is structured to store instructions that are executable by the processor and cause the processing circuit to receive, by the network interface, instructions for fulfilling the lockbox pick-up request and control the at least one robotic device to fulfill the lockbox pick-up request based on the instructions.

20 Claims, 5 Drawing Sheets

(56) References Cited

U.S. PATENT DOCUMENTS

| | | | |
|---|---|---|---|
| 7,966,093 B2* | 6/2011 | Zhuk | G06N 3/008 700/246 |
| 8,342,400 B1 | 1/2013 | Reese | |
| 8,430,303 B1 | 4/2013 | Sanders et al. | |
| 8,577,538 B2* | 11/2013 | Lenser | G05D 1/0038 701/28 |
| 8,886,390 B2* | 11/2014 | Wolfe | G06Q 10/08 701/29.1 |
| 9,261,578 B2* | 2/2016 | Im | G05D 1/0291 |
| 9,299,053 B2* | 3/2016 | Gazdzinski | G06Q 20/204 |
| 9,311,674 B2 | 4/2016 | Angus et al. | |
| 9,358,975 B1* | 6/2016 | Watts | G05D 1/0214 |
| 9,373,149 B2* | 6/2016 | Abhyanker | G05D 1/0251 |
| 9,542,673 B2 | 1/2017 | Tanner et al. | |
| 9,561,941 B1* | 2/2017 | Watts | G05D 1/0297 |
| 9,589,268 B2 | 3/2017 | Hammad | |
| 9,623,562 B1* | 4/2017 | Watts | B25J 9/1689 |
| 9,659,427 B2 | 5/2017 | Stinson | |
| 9,682,481 B2* | 6/2017 | Lutz | B25J 9/1697 |
| 9,733,646 B1* | 8/2017 | Nusser | B65G 1/137 |
| 9,745,130 B1 | 8/2017 | Rawal | |
| 9,746,852 B1* | 8/2017 | Watts | G01S 17/86 |
| 9,786,187 B1* | 10/2017 | Bar-Zeev | G01C 21/00 |
| 9,811,784 B2 | 11/2017 | Wan et al. | |
| 9,821,464 B2 | 11/2017 | Stiernagle et al. | |
| 9,824,324 B2* | 11/2017 | Trew | G06Q 10/083 |
| 9,830,272 B2 | 11/2017 | Wan et al. | |
| 9,830,606 B2 | 11/2017 | Boncimino | |
| 9,886,035 B1* | 2/2018 | Watts | G05D 1/0251 |
| 9,896,204 B1* | 2/2018 | Willison | G08G 5/0013 |
| 9,959,771 B1* | 5/2018 | Carlson | G08G 5/0039 |
| 9,959,773 B2* | 5/2018 | Raptopoulos | G05D 1/104 |
| 10,022,753 B2* | 7/2018 | Chelian | A47G 29/30 |
| 10,022,867 B2* | 7/2018 | Saboo | G05D 1/0274 |
| 10,127,528 B2 | 11/2018 | Solis | |
| 10,216,188 B2* | 2/2019 | Brady | G06Q 10/08 |
| 10,222,798 B1* | 3/2019 | Brady | G05D 1/0225 |
| 10,241,516 B1* | 3/2019 | Brady | G05D 1/0297 |
| 10,245,993 B1* | 4/2019 | Brady | B60P 1/6418 |
| 10,303,171 B1* | 5/2019 | Brady | G08G 1/207 |
| 10,354,240 B2 | 7/2019 | Purves et al. | |
| 10,362,010 B2 | 7/2019 | Sharp et al. | |
| 10,467,689 B2 | 11/2019 | Chen | |
| 10,782,686 B2* | 9/2020 | Lau | G06Q 10/083 |
| 2004/0162638 A1* | 8/2004 | Solomon | F41H 13/00 700/247 |
| 2007/0233337 A1* | 10/2007 | Plishner | G05D 1/0295 701/23 |
| 2008/0027591 A1* | 1/2008 | Lenser | G05D 1/0251 701/2 |
| 2008/0167817 A1* | 7/2008 | Hessler | G01C 21/005 701/514 |
| 2008/0301049 A1* | 12/2008 | Dyson | G07F 19/20 705/42 |
| 2010/0234995 A1* | 9/2010 | Zini | G05B 19/41895 700/258 |
| 2013/0013512 A1 | 1/2013 | Cloud et al. | |
| 2013/0126611 A1* | 5/2013 | Kangas | G07G 1/009 235/385 |
| 2013/0238121 A1* | 9/2013 | Davey | G16H 20/10 700/245 |
| 2013/0346302 A1 | 12/2013 | Purves et al. | |
| 2014/0032034 A1* | 1/2014 | Raptopoulos | G05D 1/0088 701/25 |
| 2014/0330456 A1* | 11/2014 | Lopez Morales | G05D 1/0022 701/3 |
| 2015/0006005 A1* | 1/2015 | Yu | G06Q 50/28 701/22 |
| 2015/0019423 A1 | 1/2015 | Dowling et al. | |
| 2015/0106291 A1* | 4/2015 | Robinson | G06F 21/62 705/339 |
| 2015/0154588 A1 | 6/2015 | Purves et al. | |
| 2015/0202770 A1* | 7/2015 | Patron | G06Q 20/386 700/245 |
| 2015/0227882 A1* | 8/2015 | Bhatt | G06Q 10/08355 705/330 |
| 2015/0310497 A1 | 10/2015 | Valin et al. | |
| 2015/0371226 A1 | 12/2015 | Hurley et al. | |
| 2016/0129592 A1* | 5/2016 | Saboo | B25J 5/007 700/248 |
| 2016/0132059 A1* | 5/2016 | Mason | G05D 1/0234 701/28 |
| 2016/0282126 A1* | 9/2016 | Watts | H04W 4/029 |
| 2017/0011333 A1* | 1/2017 | Greiner | G06Q 10/083 |
| 2017/0100837 A1* | 4/2017 | Zevenbergen | B25J 19/005 |
| 2017/0113352 A1* | 4/2017 | Lutz | G05D 1/0291 |
| 2017/0124547 A1* | 5/2017 | Natarajan | G06Q 20/204 |
| 2017/0147975 A1* | 5/2017 | Natarajan | G05D 1/0676 |
| 2017/0255896 A1* | 9/2017 | Van Dyke | A47G 29/141 |
| 2017/0308098 A1* | 10/2017 | Yu | G05D 1/024 |
| 2018/0024554 A1* | 1/2018 | Brady | G05D 1/0088 701/23 |
| 2018/0068312 A1 | 3/2018 | Kim et al. | |
| 2018/0174102 A1* | 6/2018 | Winkle | G06Q 10/08355 |
| 2018/0190054 A1* | 7/2018 | Perez | G07C 9/00309 |
| 2018/0246526 A1* | 8/2018 | Wilkinson | G05D 1/0291 |
| 2018/0253727 A1 | 9/2018 | Ortiz et al. | |
| 2018/0315024 A1 | 11/2018 | Rauch et al. | |
| 2019/0005467 A1 | 1/2019 | Varagani et al. | |
| 2019/0012637 A1* | 1/2019 | Gillen | H04L 9/0637 |
| 2019/0019144 A1* | 1/2019 | Gillen | H04L 9/3242 |
| 2019/0033856 A1* | 1/2019 | Ferguson | G05D 1/0027 |
| 2019/0087894 A1 | 3/2019 | Bloy et al. | |
| 2019/0114564 A1* | 4/2019 | Ferguson | G06Q 10/06312 |
| 2019/0164165 A1* | 5/2019 | Ithabathula | G06F 21/32 |
| 2019/0205851 A1 | 7/2019 | Sinha et al. | |
| 2019/0244263 A1 | 8/2019 | Nelson et al. | |
| 2019/0303910 A1 | 10/2019 | Asbe et al. | |
| 2019/0369641 A1* | 12/2019 | Gillett | A63F 9/24 |
| 2021/0047863 A1* | 2/2021 | Kolls | G07C 9/00571 |

* cited by examiner

SYSTEMS AND METHODS FOR SECURE LOCKER FEEDERS

BACKGROUND

Providers of banking services provide a plethora of financial services to customers to assist in the completion of transactions and to meet the needs of the customers. One service includes assisting with transactions that involve "in-hand" funds, for example, the withdrawal or deposit of cash. Currently, a customer may engage in the withdrawals and deposits of these funds by walking into a branch location of a provider and initiating the withdrawal or deposit request via interaction with a teller at the branch. However, the customer is only able to access the provider during operating hours, which are usually between the hours of 9 AM to 5 PM. Many customers may find these hours inconvenient and in conflict with their work schedules, requiring them to leave a job during the work day to complete the desired transaction. Additionally, customers may have to wait for banking services at branch locations. While a provider may have automated teller machines ("ATMs") in various locations outside of a branch location to allow the customer, at any hour of the day, to withdraw cash after authenticating at the ATM, the type of transactions and the transaction amounts are often limited at ATMs.

SUMMARY

One embodiment relates to a feeder system for fulfilling lockbox pick-up requests. The feeder system includes a network interface configured to communicate with a computing system associated with a provider of lockbox services and at least one robotic device. Each robotic device includes at least one secure compartment configured to hold one or more items associated with a lockbox pick-up request. The feeder system further includes a processing circuit including a processor and a memory. The memory is structured to store instructions that are executable by the processor and cause the processing circuit to receive, by the network interface, instructions for fulfilling the lockbox pick-up request and control the at least one robotic device to fulfill the lockbox pick-up request based on the instructions.

Another embodiment relates to a method of fulfilling a lockbox pick-up request. The method includes providing a feeder system including at least one robotic device. Each robotic device includes at least one secure compartment configured to hold one or more items associated with a lockbox pick-up request. The method further includes receiving instructions for fulfilling the lockbox pick-up request and controlling the at least one robotic device to fulfill the lockbox pick-up request based on the instructions.

Another embodiment relates to a lockbox system. The lockbox system includes a bank of one or more lockboxes. Each lockbox includes a receptacle and a locking mechanism. The lockbox system also includes a feeder system. The feeder system includes a network interface configured to communicate with a computing system associated with a provider of lockbox services and one or more robotic devices. Each robotic device includes at least one secure compartment configured to hold one or more items associated with a lockbox pick-up request. The feeder system further includes a processing circuit comprising a processor and a memory. The memory is structured to store instructions that are executable by the processor and cause the processing circuit to receive, by the network interface, instructions for fulfilling the lockbox pick-up request and control the one or more robotic devices to gather and deliver the one or more items to a lockbox from the lockbox bank based on the instructions.

DETAILED DESCRIPTION

Figure 1:
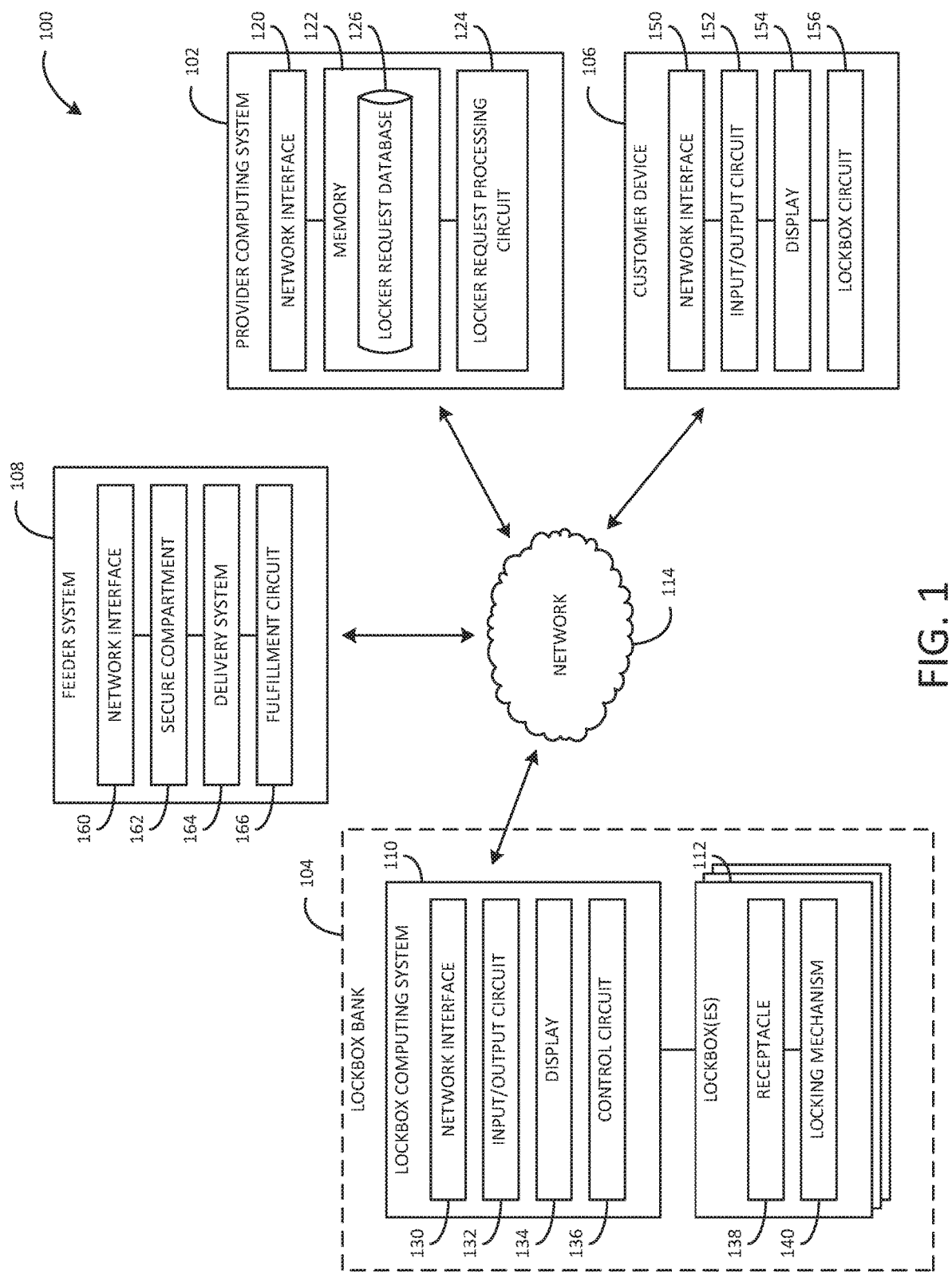
FIG. 1 illustrates a schematic diagram of a lockbox system, according to an example embodiment.

Referring generally to the figures, systems and methods for preparing a pick-up for a customer at a lockable box pick-up location are described. "Lockable boxes," also referred to herein as "lockboxes," include locking receptacles configured to receive, for example, currency, payment cards, documents, etc. for pick-up by a customer. Additionally, in some embodiments, the locking receptacles are configured to receive drop-offs, such as currency deposit drop-offs, from customers. Lockboxes can be provided in a variety of shapes and configurations, such as a traditional grid of rectangles when viewed from the front, but also hexagons, octagons, circles, triangles, shapes conducive for stacking, shapes conducive for aligning, and shapes that fit in with other lockboxes to form an overall shape or design. Additionally, lockboxes include lockable cubbies, lockers, compartments, cabinets, drawers, bins, baskets, boxes, caddies, capsules, cartridges, shells, chests, trunks, canisters, cubes, cubicles, cells, and the like. Lockboxes can be provided at a variety of locations, such as a branch of a bank, a mall, a parking lot, a student union, and the like.

According to the systems and methods described herein, a customer requests a pick-up of one or more items from a provider of lockbox services (e.g., a financial institution, a merchant), where the customer will retrieve the pick-up from a bank of one or more lockboxes. For example, the customer requests a pick-up including one or more of currency, a payment card (e.g., a debit card, a credit card), an identification card, an identity token, one or more documents, a chip for payment instruments, and so on. A locker feeder system automatically prepares the pick-up for the customer (e.g., with minimal human interaction or oversight) and loads the pick-up into a lockbox. The customer provides access credentials to the lockbox bank and, once verified, is able to retrieve the pick-up item(s) from the lockbox.

The systems and methods described herein provide a number of technical advantages over present systems and methods for preparing customer pick-ups at lockbox bank locations. For example, pick-ups at secure lockbox locations are currently prepared and loaded into lockboxes by human workers. Depending on the pick-up request, this can require considerable manual work for the workers involved and can be prone to human error. If the human error results in the loading of incorrect materials into a secure lockbox, the customer retrieving the pick-up will receive the wrong items, creating an unsatisfactory experience for the customer. Moreover, if the customer incorrectly receives something valuable as part of their pick-up (e.g., the customer is wrongly provided with currency), the customer may not be willing to give the valuable item back to the provider once the mistake is discovered. As such, the present systems and methods are directed to automatic, secure locker feeders that prepare and load pick-ups into lockboxes with minimal human oversight. These secure locker feeders decrease the amount of human labor that must be used to prepare lockbox pick-ups and instead free human workers for fulfilling more complicated pick-up requests. Additionally, because these secure locker feeders follow instructions for automatically preparing lockbox pick-ups, these secure locker feeders further decrease the number of errors committed in preparing lockbox pick-ups. In turn, this increases customer satisfaction with the lockbox system, which is less error-prone, and helps ensure that valuable items are delivered to the correct customers.

Referring now to FIG. 1, an environmental view of a lockbox system 100 is shown, according to an exemplary embodiment. The lockbox system 100 includes a provider computing system 102, a lockbox bank 104, a customer device 106, and a secure feeder system 108. In turn, the lockbox bank 104 includes a terminal of a lockbox computing system 110 operatively coupled to one or more lockboxes 112. The provider computing system 102, lockbox bank 104, customer device 106, and secure feeder system 108 are connected by a secure network (e.g., network 114). In some embodiments, the network 114 includes the Internet, cellular networks, proprietary banking networks, intranets, and the like.

The provider computing system 102 is associated with a provider of lockbox services, as described herein. In some embodiments, the provider is a provider of financial accounts and services (e.g., demand deposit accounts, credit services, loan services, investment services). For example, in some arrangements, the account provider is a financial institution, such as a bank or a credit union. In other embodiments, the provider associated with the provider computing system 102 is a merchant. As an example, the provider uses the lockbox bank 104 to deliver goods and documents to various customers. In other embodiments, the provider associated with the provider computing system 102 is a different type of provider, such as a provider of documents, identification cards, letters or other correspondence, and so on. As shown in FIG. 1, the provider computing system 102 includes a network interface 120, a memory 122, and a lockbox request processing circuit 124. Additionally, the memory 122 includes a lockbox request database 126.

The network interface 120 is structured to facilitate operative communication between the provider computing system 102 and the other components of the system 100. For example, the network interface 120 is structured to facilitate communication between the provider computing system 102 and the customer device 106, secure feeder system 108, and lockbox computing system 110.

The lockbox request database 126 is structured to retrievably store information about the one or more lockboxes 112. As examples, the lockbox request database 126 retrievably stores information about the locations of the one or more lockboxes 112, lockbox 112 availability, lockbox 112 access hours, and so on. Moreover, the lockbox request database 126 is configured to retrievably store information about lockbox pick-up requests submitted by customers. For example, the lockbox request database 126 stores an order number for a lockbox pick-up request submitted by a customer in association with a list of one or more items requested by the customer for inclusion in the lockbox pick-up and a lockbox assigned for the pick-up retrieval. In some embodiments, the lockbox request database 126 is further configured to retrievably store information about lockbox drop-off requests, such as requests by customers to use the one or more lockboxes 112 to make a currency deposit with the provider.

The lockbox request processing circuit 124 is structured to facilitate the back-end process necessary to conduct a lockbox pick-up. Accordingly, the lockbox request processing circuit 124 is configured to receive and process a customer request for a pick-up. Further, the lockbox request processing circuit 124 is configured to retrieve information about the one or more lockboxes 112 from the lockbox request database 126. In some arrangements, the lockbox request processing circuit 124 is initiated in response to the customer using the customer device 106 to arrange a lockbox pick-up. In other arrangements, the lockbox request processing circuit 124 is initiated in response to the customer using another method to arrange a lockbox pick-up, such as by arranging the lockbox pick-up at the terminal of the lockbox computing system 110 at the lockbox bank 104 or at a branch location of the provider. In response to receipt of the lockbox pick-up request, the lockbox request processing circuit 124 is configured to provide the customer with information about the pick-up, such as a confirmation of the request, a location and time for the pick-up, and instructions for the pick-up. Additionally, the lockbox request processing circuit 124 is configured to provide instructions to the feeder system 108 for fulfilling the pick-up request, as described in further detail below with reference to the feeder system 108.

The customer retrieves the lockbox pick-up at the lockbox bank 104, which includes one or more lockboxes 112 and a terminal of the lockbox computing system 110 communicably coupled to the one or more lockboxes 112. The lockbox computing system 110 controls the operation of and access to the one or more lockboxes 112. In some arrangements, the one or more lockboxes 112 are provided at a lockbox bank 104 location, and the lockbox computing system only controls the lockbox(es) 112 at that given location. For example, a building contains fifty lockboxes 112 that are controlled by a first lockbox computing system 110 connected to the provider computing system 102, and another building contains ten lockboxes 112 that are controlled by a second lockbox computing system 110. In other arrangements, the lockbox computing system 110 controls all lockboxes 112 provided as part of the lockbox pick-up service. In yet other arrangements, the lockbox computing system 110 is associated with a single lockbox 112.

As illustrated in FIG. 1, the lockbox computing system 110 includes a network interface 130, an input/output circuit 132, a display 134, and a control circuit 136. The network interface 130 is structured to facilitate operative communication between the lockbox computing system 110 and the other components of the system 100. For example, the network interface 130 is structured to facilitate communication between the lockbox computing system 110 and the provider computing system 102, the customer device 106, and the feeder system 108.

The input/output circuit 132 is configured to receive input from various customers via the lockbox computing system 110 and/or provide output to various customers via the lockbox computing system 110. In some embodiments, the input/output circuit 132 includes one or more input and/or output devices. In one example, the input/output circuit 132 includes a keypad, a biometric sensor, a card reader, a barcode scanner, and/or a fob sensor. In some arrangements, the input/output circuit 132 includes a near-field communication ("NFC") device that is configured to communicate short-range with a second NFC device once the two devices are brought in close contact (e.g., an "NFC tap"). As such, the customer can use the NFC device to communicate access credentials to the lockbox computing system 110 to access a lockbox 112. In other arrangements, the input/output circuit 132 instead includes a different short-range communication device (e.g., a radiofrequency identification "RFID" device). In other embodiments, alternatively or additionally, the input/output circuit 132 is configured to receive communications from and/or send communications to one or more other components of the lockbox computing system 110. The customer uses the input/output circuit 132 to provide access credentials to the lockbox computing system 110 so that the customer can access a lockbox 112 containing the one or more items included in the customer's pick-up. Further, in some arrangements, the customer uses the input/output circuit 132 to request a pick-up.

In some arrangements, the input/output circuit 132 is provided at a terminal of the lockbox computing system 110 at the lockbox bank 104. Alternatively, in other arrangements, the input/output circuit 132 is at least partially provided as part of each of the lockboxes 112. For example, each lockbox 112 includes a keypad, NFC device, biometric sensor, card reader, barcode sensor, and/or fob reader. The customer then provides access credentials at the lockbox 112 containing the customer's pick-up. The lockbox computing system 110 thus receives the access credentials via the input/output circuit 132 component(s) provided at the lockbox 112.

The display 134 is configured to visually present information (e.g., as user interfaces) to the customer. In some embodiments, the display 134 is further configured to receive information from the customer (e.g., through a keyboard provided as part of a touchscreen of the display 134). Additionally, in some arrangements, the display 134 is included in or communicably coupled to the input/output circuit 132.

The control circuit 136 is configured to receive an authentication request from a customer at the lockbox computing system 110 terminal. The control circuit 136 then determines whether to grant the requestor access to a lockbox 112. In various embodiments, the control circuit 136 is configured to receive one or more access credentials, such as an order number, a passcode, a password, a PIN, a biometric, an access code, or the like, from a customer (e.g., via a touchscreen of the display 134, via the customer device 106 communicating through an NFC device incorporated as part of the input/output circuit 132, via an identification fob). The control circuit 136 is configured to then authenticate the customer using the access credential(s). In some arrangements, the control circuit 136 is configured to authenticate the customer by providing the access credential(s) to the provider computing system 102, which verifies the access credential(s) and provides the control circuit 136 with an indication of whether the customer is authenticated. In other embodiments, the control circuit 136 is configured to authenticate the customer. In one example, the provider computing system 102 provides a list of verified order numbers to the lockbox computing system 110. The control circuit 136 is thus configured to grant lockbox 112 access to a customer who provides one of the verified order numbers to the lockbox computing system 110. Additionally, in some embodiments, the control circuit 136 is configured to maintain a log of access requests, for example, including timestamps, identification of the requestor, a record of the access credential(s) provided to the control circuit 136, and other information describing the request. Further, in some embodiments, the control circuit 136 also transmits instructions for fulfilling the pick-up request to the feeder system 108, as described in further detail below with reference to the feeder system 108.

The one or more lockboxes 112 are structured to be secure containers for receiving pick-ups. In some embodiments, the one or more lockboxes 112 are configured specifically for pick-ups. In other embodiments, the one or more lockboxes 112 are configured to serve other lockbox functions (e.g., as drop-off deposit locations) and are repurposed as pick-up lockboxes 112, for example, during certain business hours.

In some embodiments, each lockbox 112 is a modular, self-locomoting unit that can mate to other lockboxes 112 and/or a support structure, such as a frame, wall, or floor, to form the lockbox bank 104. In some embodiments, the one ore more lockboxes 112 are structured horizontally and/or vertically in the lockbox bank 104, where the lockbox bank 104 as a whole is not accessible to the public. For example, the one or more lockboxes are provided behind a wall that is not accessible to the public, and the terminal of the lockbox computing system 110 and an access point are provided on the other side of the wall that is accessible to the public. The vertical lockboxes 112 are raised and lowered, for example, by a mechanism driven through a frame supporting the lockboxes 112. Similarly, in some examples, the horizontal lockboxes 112 are moved side to side by a mechanism driven through the frame. The lockers can thus be repositioned horizontally or vertically to mate with a door of an access point that opens toward the recipient of the contents; otherwise the lockboxes 112 are inaccessible to the recipient and other customers. In various arrangements, the repositioning is initiated by the recipient signaling (e.g., via the terminal of the lockbox computing system 110) that they are ready to pick up the contents.

Each lockbox 112 includes a secure receptacle 138 configured to receive a pick-up for a customer. The configuration of the secure receptacle 138 depends on the configuration of the lockbox 112. In one example, the lockbox 112 is shaped as a cube, and the secure receptacle 138 is also cube-shaped. The size of the secure receptacle 138 can also vary depending on, for example, the configuration of the lockbox 112 or the intended use of the lockbox 112. In one example, the lockbox bank 104 includes lockboxes 112 in different sizes with differently sized secure receptacles 138 configured to receive different pick-ups or different types of pick-ups. In another example, the secure receptacle 138 is configured with repositories for different types of currency (e.g., including coin repositories and bill repositories), different types of documents, different types of cards, and so on. Additionally, in some embodiments, the secure receptacle 138 is configured to be altered or adjusted to move a pick-up from the secure receptacle 138 to a secure location (e.g., a safe), for example, in response to the customer not retrieving the pick-up within a certain time period.

Each lockbox 112 also includes a locking mechanism 140 configured to lock, open, close, or otherwise control access to the secure receptacle 138. For example, a locking mechanism 140 according to various embodiments includes a solenoid, motor, actuator, or other mechanical device configured to physically lock or unlock a door or other access point (e.g., implemented as a magnetic lock configured to selectively power and de-power an electromagnet that holds a door in a locked position). The locking mechanism 140 is controlled by the lockbox computing system 110 such that the lockbox computing system 110 limits access to the secure receptacle 138. Additionally, in some embodiments, each lockbox further contains one or more sensors, such as weight sensors to verify that the correct pick-up has been placed inside the lockbox 112.

The customer device 106 is associated with a customer of the provider that is associated with the provider computing system 102. As an example, the customer holds an account (e.g., a demand deposit account) with the provider. In various embodiments, the customer device 106 is a stationary or portable (e.g., mobile) computing device. As such, the customer device 106 includes, for example, any of a smartphone, a tablet, a laptop, a desktop computing system, a smart watch, smart glasses, and so on. As shown in FIG. 1, the customer device 106 includes a network interface 150, an input/output circuit 152, a display 154, and a lockbox circuit 156.

The network interface 150 is structured to facilitate operative communication between the customer device 106 and the other components of the system 100. For example, the network interface 150 is structured to facilitate communication between the customer device 106 and the provider computing system 102 and the lockbox computing system 110.

The input/output circuit 152 is configured to receive input from the customer via the customer device 106 and/or provide output to the customer via the customer device 106. Similar to the input/output circuit 132 of the lockbox computing system 110, in some embodiments, the input/output circuit 152 includes one or more input and/or output device. In other embodiments, alternatively or additionally, the input/output circuit 152 is configured to receive communications from and/or send communications to one or more other components of the customer device 106. The customer uses the input/output circuit 152 to request a lockbox pick-up from the provider computing system 102 and/or the lockbox computing system 110. Additionally, in some arrangements, the input/output circuit 152 provides information received from the provider computing system 102 and/or the lockbox computing system 110 regarding a lockbox pick-up to the customer. Further, in some arrangements, the input/output circuit 152 includes an NFC device. Accordingly, in such arrangements, the customer can use the customer device 106 to communicate access credentials to the lockbox computing system 110 via the NFC device to access a lockbox 112.

The display 154 is configured to visually present information (e.g., as user interfaces) to the customer. In some embodiments, the display 154 is further configured to receive information from the customer (e.g., through a keyboard provided as part of a touchscreen of the display 154). Additionally, in some arrangements, the display 154 is included in or communicably coupled to the input/output circuit 152.

The lockbox circuit 156 is configured to allow the customer to request a pick-up. For example, in some embodiments, the lockbox circuit 156 is configured to provide the customer with user interfaces for arranging a lockbox pick-up. In other embodiments, the lockbox circuit 156 is alternatively or additionally configured to provide the customer with user interfaces showing the customer information about a planned pick-up and/or a completed pick-up. The lockbox circuit 156 includes program logic (e.g., stored executable instructions) structured to implement at least some of the functions described herein. In some arrangements, the lockbox circuit 156 is implemented by accessing a website associated with the system 100 via a web browser (e.g., Safari®, Chrome®, Internet Explorer®) structured to receive and display web pages received from the provider computing system 102 and/or the lockbox computing system 110. As an illustration, the customer accesses lockbox services by logging into a provider account using online banking credentials (e.g., a username and password) via a webpage. In other arrangements, the lockbox circuit 156 is implemented as an application downloadable from an application store or from a specific website (e.g., a website associated with the provider computing system 102). In yet other arrangements, the lockbox circuit 156 is implemented through an existing or generic application, such as a text message application or an email application.

The feeder system 108 is configured to automatically fulfill customer pick-up requests submitted to the provider computing system 102 and/or the lockbox computing system 110. For example, the feeder system 108 is configured on a back side of the lockbox bank 104 (e.g., a secure side of the lockbox bank 104 not accessible by the public) such that the feeder system 108 has access to the one or more lockboxes 112 from the back. Accordingly, the feeder system 108 receives instructions for fulfilling a customer pick-up request for one or more items (e.g., from the provider computing system 102 or the lockbox computing system 110), prepares the pick-up item(s), and stores the pick-up item(s) in a lockbox 112 for the customer to retrieve (e.g., after the customer provides access credentials to the lockbox computing system 110, which the lockbox computing system 110 verifies, and the lockbox computing system 110 opens the locking mechanism 140 for the lockbox 112 storing the pick-up item(s)).

In some embodiments, the feeder system 108 is configured as one or more robotic devices. Each robotic device includes a secure compartment (e.g., a secure compartment 162). Accordingly, based on instructions from the provider computing system 102 or the lockbox computing system 110, the robotic device collects the pick-up item(s) requested by the customer and deposits them in the secure compartment. The robot then transports the pick-up item(s) to a lockbox 112 selected for the customer (e.g., by the provider computing system 102 or the lockbox computing system 110) and delivers the pick-up item(s) securely into the lockbox 112. For example, the robot opens a back panel of the lockbox 112 and deposits the item(s) through the open back side of the lockbox 112.

In other embodiments, the feeder system 108 is configured as storage lockers next to a moving track or conveyor belt. The storage lockers each hold items that customers may request for pick-up. For example, one storage locker holds currency, another storage locker holds a card printer (e.g., a payment card printer, an identification card printer), another storage locker holds a document printer (e.g., a printer used to print documents for the customer), another storage locker holds identity tokens, and so on. The feeder system 108 further includes a delivery locker that moves along the track and gathers the items necessary to fulfill a given pick-up request from the storage lockers. As an illustration, if the customer has requested a payment card, the delivery locker moves along the track to the storage locker holding the card printer. The storage locker prints the payment card for the customer (e.g., in response to instructions transmitted by the provider computing system 102 or the lockbox computing system 110 or in response to instructions transmitted by the delivery locker), which the delivery locker receives. The delivery locker then delivers the pick-up item(s) to a lockbox 112 selected for the customer.

It should be understood, however, that the above embodiments are intended to be exemplary and that other embodiments of feeder systems 108 for automatically fulfilling customer pick-up requests are also contemplated herein. For example, in one alternative embodiment, the feeder system 108 is configured as a series of mechanical arms that access pick-up items, grasp the pick-up item(s) necessary to fulfill a pick-up request, and deliver the pick-up item(s) securely to a lockbox 112 for the customer. Moreover, in other embodiments, the feeder system 108 is configured to deliver the pick-up item(s) to the lockbox 112 in a different manner. In one example, rather than opening a back panel of the lockbox 112, the feeder system 108 uses a chute system configured to deliver items to the one or more lockboxes 112 of the lockbox bank 104 via chutes connected to each of the lockboxes 112.

As shown in FIG. 1, in various embodiments, the feeder system 108 includes a network interface 160, a secure compartment 162, a delivery system 164, and a fulfillment circuit 166. The network interface 160 is structured to facilitate operative communication between the feeder system 108 and the other components of the system 100. For example, the network interface 160 is structured to facilitate communication between the feeder system 108 and the provider computing system 102 and the lockbox computing system 110. However, it should be understood that in other embodiments, the feeder system 108 does not include the network interface 160. In one example, the feeder system 108 includes a wired connection to at least part of the provider computing system 102 and/or the lockbox computing system 110. Alternatively, in some arrangements, the feeder system 108 includes a network interface 160 configured to communicate through a short-range or local network (e.g., an intranet) rather than via the network 114.

The secure compartment 162 is configured to hold one or more pick-up items included as part of a customer's lockbox pick-up request while the feeder system 108 delivers the item(s) to the lockbox 112. For example, in some embodiments, the secure compartment 162 is configured similarly to the receptacle 138 such that the secure compartment 162 can be docked to the receptacle 138 for delivery of the item(s). As an illustration, the secure compartment 162 is configured to be the same shape as the receptacle 138 such that the secure compartment 162 can be mated and attached to the receptacle 138 (e.g., via clamps or hooks configured to adjoin with slots on the lockbox 112). Additionally, in some implementations, the lockbox bank 104 includes lockboxes 112 of different shapes (e.g., a first type of lockbox 112 in a first shape and a second type of lockbox 112 in a second shape), and the feeder system 108 accordingly includes secure compartments 162 of shapes matching the different shapes of the lockboxes 112 (e.g., a first type of robotic device including a secure compartment 162 shaped to dock with the first shape of lockbox 112 and a second type of robotic device including a secure compartment 162 shaped to dock with the second shape of lockbox 112). As such, once the secure compartment 162 is docked to the receptacle 138, the lockbox pick-up item(s) can be transferred from the secure compartment 162 to the receptacle 138 without the possibility of some of the item(s) falling out of the secure compartment 162. Further, in some embodiments, the secure compartment 162 is configured to dock with another secure compartment and/or robotic device. For example, the secure compartment 162 is provided in a first robotic device, and a second robotic device contains a second secure compartment 162 containing one or more items for a pick-up. The secure compartment 162 of the first robotic device is configured to dock with the secure compartment 162 of the second robotic device to receive the pick-up item(s) and deliver the pick-up items(s) to the lockbox 112.

Additionally, similar to the receptacle 138, in some arrangements, the secure compartment 162 includes a locking mechanism used to selectively open and close the secure compartment 162. In one example, the secure compartment 162 includes a front panel that is locked when the secure compartment 162 is in the closed position (e.g., when the secure compartment is transporting pick-up item(s)) and that is unlocked to reveal the secure compartment 162 when the secure compartment 162 is in the open position (e.g., when the secure compartment is loading pick-up item(s) or delivering pick-up item(s)). For example, the front panel is unlocked and slid upwards or to the side to reveal the secure compartment 162. It should also be understood that, in some embodiments, the feeder system 108 includes more than one secure compartment 162, such as where the feeder system 108 is implemented as multiple robotic devices or multiple storage/delivery lockers, as described above. Additionally, it should be understood that, in some embodiments, the feeder system 108 includes more than one way to access the secure compartment 162. As an example, if the lockboxes 112 are arranged in rows of stacked lockboxes 112, the secure compartment 162 includes a front panel can be used to access the secure compartment 162 for lockboxes 112 that are lower to the ground (e.g., in a first row or a first and second row) and a top panel that can be used to access the secure compartment 162 for lockboxes that are further from the ground (e.g., above a first row or above a second row).

The delivery system 164 is configured to retrieve the one or more pick-up items included as part of a customer's lockbox pick-up request, store the item(s) in the secure compartment 162, and deliver the item(s) to the lockbox 112. For example, in some embodiments, the delivery system 164 is implemented as one or more robotic components, such as arms, that can grasp the item(s) to move and deliver the item(s). In other embodiments, the delivery system 164 is implemented as levers and panels that can move to slide the item(s) into and out of the secure compartment 162. In one example, the bottom of the secure compartment 162 can raise up to create a slide that moves any items held within the secure compartment 162 out of the secure compartment 162 (e.g., into the receptacle 138 of the lockbox 112). In another example, the bottom of the secure compartment 162 includes a container that holds the pick-up item(s) and that the feeder system 108 can move and rotate to push the item(s) into the receptacle 138 of the lockbox 112. It should be understood, however, that any mechanical delivery system that can be used to retrieve and deliver item(s) is contemplated herein.

Additionally, in some embodiments, the delivery system 164 includes various components used to move the secure compartment 162. In one embodiment, the delivery system 164 includes wheels and a driving system that can be used to move the secure compartment 162 to sources for the pick-up item(s) and/or move the secure compartment 162 to the lockbox 112. In another embodiment, the delivery system 164 includes a moving track or a moving conveyor belt that is used to move the secure compartment 162. In another embodiment, the delivery system 164 includes a system for moving the secure compartment 162 such that the secure compartment 162 can be moved to lockboxes 112 positioned off from the ground (e.g., lockboxes 112 positioned in stacked rows above the ground), such as a system including tracks or grooves (e.g., positioned along a wall containing the lockbox bank 104) that the secure compartment 162 can be moved along and/or up and down. In another embodiment, the one or more lockboxes 112 are raised and lowered by a mechanism driven through a frame that supports the one or more lockboxes 112. As such, the delivery system 164 is configured to initiate movement of the lockbox 112 selected for the customer to bring the lockbox 112 to the secure compartment 162 and move the pick-up item(s) to the lockbox 112 once, for example, the secure compartment 162 is docked with the lockbox 112.

The fulfillment circuit 166 is configured to receive instructions from the provider computing system 102 and/or the lockbox computing system 110 for fulfilling the pick-up request. In one embodiment, in response to receiving a pick-up request from a customer, the provider computing system 102 transmits a list of the one or more items included in the pick-up request to the fulfillment circuit 166. The fulfillment circuit 166 then controls the feeder system 108 to gather the one or more items and store them in a lockbox 112 selected for the customer (e.g., by the provider computing system 102 or the lockbox computing system 110). In some arrangements, the provider computing system 102 also transmits a timing for the fulfillment circuit 166 to follow. For example, the provider computing system 102 transmits a time to the fulfillment circuit 166 by which the provider computing system 102 has indicated to the customer that the pick-up will be ready. Accordingly, the fulfillment circuit 166 uses that time to ensure that the pick-up is appropriately ready for the customer without, for example, preparing the pick-up so early that the lockbox 112 is unable to be used for other customers in the interim. In another embodiment, the fulfillment circuit 166 at least partially receives the pick-up preparation instructions from the lockbox computing system 110. As an example, the fulfillment circuit 166 receives an indication of the lockbox 112 to be used for the pick-up from the lockbox computing system 110, with the lockbox computing system 110 storing a log of which lockboxes 112 are to be used and when.

Additionally, the fulfillment circuit 166 is configured to communicate with the components of the feeder system 108 for preparing the lockbox pick-up. In one example, the fulfillment circuit 166 provides instructions to print documents or cards, gather currency, configure an identification fob for the customer, and so on to various components of the feeder system 108 (e.g., to secure lockers containing document and/or card printers, currency, blank identification fobs, and so on). In another example, the fulfillment circuit 166 provides instructions to a component of the feeder system 108 (e.g., a delivery locker), which provides further instructions internally (e.g., to one or more storage lockers) to, for instance, print documents or cards, gather currency, configure an identification fob for the customer, and so on. In another example, the fulfillment circuit 166 provides at least some instructions to human workers for preparing the lockbox pick-up. As an illustration, if the customer wants to pick up an item being held in a deposit box, the fulfillment circuit 166 provides instructions to a human worker (e.g., at an instruction hub or terminal) to retrieve the item being held in the deposit box and deposit the item directly to the lockbox 112 or with the feeder system 108 for delivery to the lockbox 112. Furthermore, in various arrangements, the fulfillment circuit 166 is configured to control components of the feeder system to move the secure compartment 162 containing the item(s) to and from the lockbox 112.

The fulfillment circuit 166 is also configured to keep a log of the actions taken to fulfill the lockbox pick-up request. For example, the fulfillment circuit 166 posts to a ledger (e.g., an internal log, a distributed ledger) information about the pick-up request (e.g., the customer requesting the pick-up, the time and date arranged for the pick-up); a list of items gathered for the pick-up request, as well as times and the provenance of each item (e.g., where the item was gathered from, retrieved from, or produced and when); and when the items were delivered to the lockbox 112. If a human worker assisted with the fulfillment of the pick-up request, the fulfillment circuit 166 further identifies the human worker, what the human worker did, and the timing of the human worker's actions to the ledger.

Figure 2:
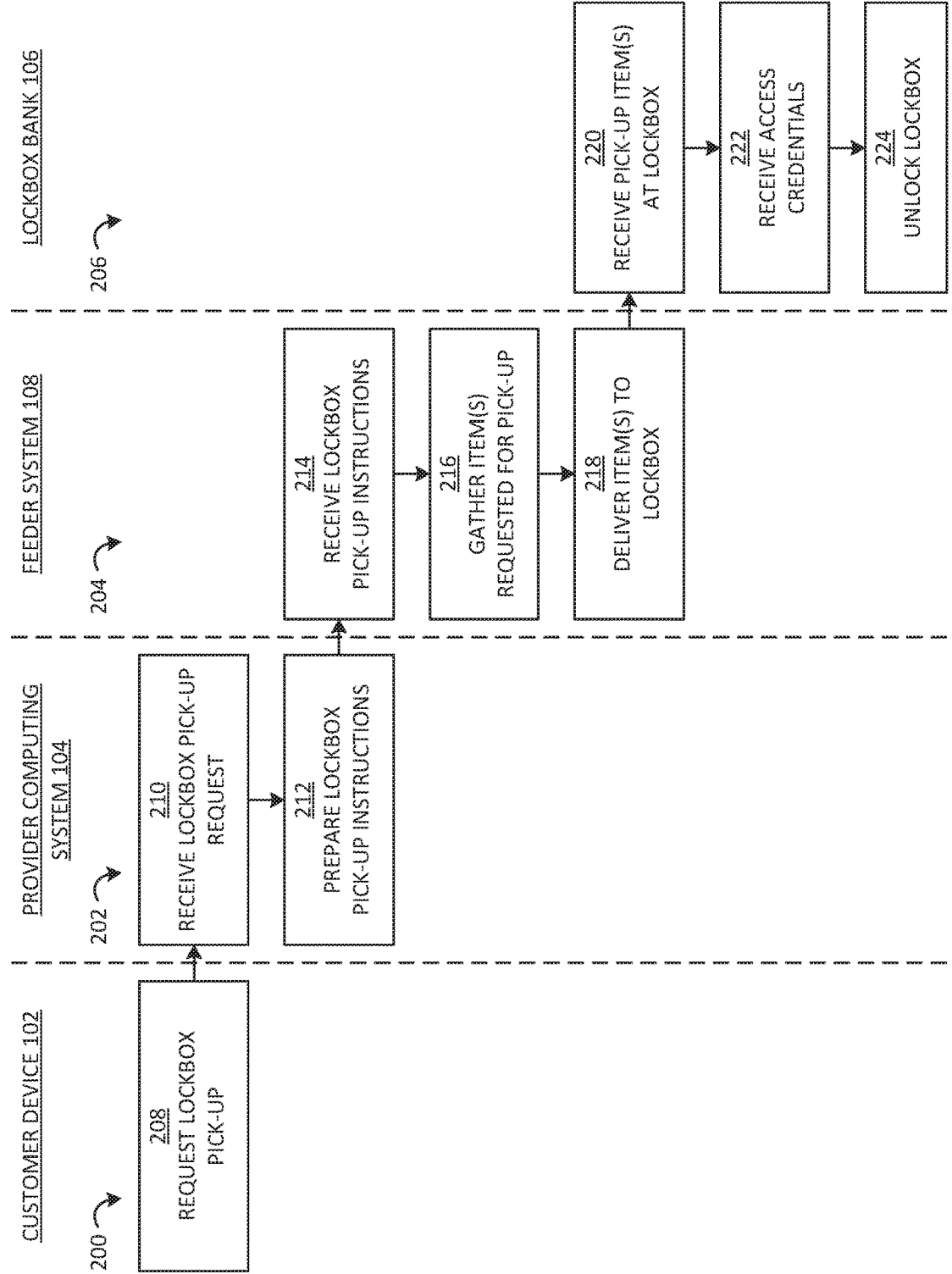
FIG. 2 illustrates a flow diagram of a method of preparing a lockbox pick-up for a customer, according to an example embodiment.

Referring to FIG. 2, a flow diagram of a method of preparing a lockbox pick-up is shown, according to an exemplary embodiment. The method illustrated in FIG. 2 includes several processes: a process 200 is performed in connection with a customer and the customer device 106, a process 202 is performed by the provider computing system 102, a process 204 is performed by the feeder system 108, and a process 206 is performed by the lockbox bank 104.

The customer requests a lockbox pick-up at 208. In some embodiments, the customer uses the customer device 106 to access, for example, an application or a website associated with the provider, through which the customer inputs information about the requested pick-up. For example, the customer inputs the one or more requested items that the customer would like to pick up, such as the amount of a currency withdrawal from an account the customer holds with the provider, a payment card, an identification card, an identification fob, one or more documents, and so on. The provider computing system 102 then uses that information to set up the pick-up. In some arrangements, the customer also inputs additional information about the pick-up, such as a desired location and/or time for the pick-up. In other embodiments, the customer sets up the lockbox pick-up through another method, such as by calling a service center associated with the provider, using the lockbox computing system 110, or visiting a branch location associated with the provider and working with a provider employee to set up the pick-up.

The provider computing system 102 receives the lockbox pick-up request at 210. In response, the provider computing system 102 prepares lockbox pick-up instructions for the feeder system 108 at 212. For example, the provider computing system 102 prepares a list of the item(s) requested by the customer for the lockbox pick-up and a timing for the pick-up. The provider computing system 102 then transmits the instructions to the feeder system 108.

The feeder system 108 receives the lockbox pick-up instructions from the provider computing system 102 at 214. In response, the feeder system 108 gathers the lockbox pick-up item(s) at 216 and delivers the item(s) to the lockbox 112 for pick-up at 218. As an example, in one embodiment, the feeder system 108 uses a robotic device that gathers the item(s) into the secure compartment 162 in the robotic device (e.g., from a currency dispenser, a card printer, a document printer, etc.). The feeder system 108 uses the robotic device to transport the items to the lockbox 112 assigned for the pick-up and deliver the items into the lockbox 112. In another embodiment, the feeder system 108 controls a robotic device containing one or more secure compartments 162 including currency dispensers, printers, fob containers, and so on to organize and/or generate the necessary items, move to the lockbox 112, and deposit the item(s) inside the lockbox 112. In another embodiment, the feeder system 108 gathers the item(s) at one or more storage lockers (e.g., by printing any necessary items at a card printer or document printer locker, by organizing any currency for the pick-up at a currency locker, etc.), where the one or more storage lockers are arranged alongside a track. The feeder system 108 then controls the track to move a delivery locker containing the secure compartment 162 to pick up the item(s) from the one or more storage lockers into the secure compartment 162. The feeder system 108 further controls the track to move the delivery locker to the lockbox 112 assigned for the pick-up and deliver the item(s) to the lockbox 112.

The lockbox bank 104 receives the pick-up item(s) at the lockbox 112 at 220. The lockbox bank 104 further receives access credential(s) from the customer at 222. For example, the lockbox bank 104 receives one or more access credentials from the customer at the lockbox computing system 110, as described above. In response to verifying that the access credential(s) are correct, the lockbox bank 104 unlocks the lockbox 112 containing the customer's pick-up item(s) at 224. For example, the lockbox computing system 110 pops open the lockbox 112 or displays the number of the lockbox 112 on the display 134 such that the customer knows which lockbox 112 contains the customer's item(s).

Figure 3:
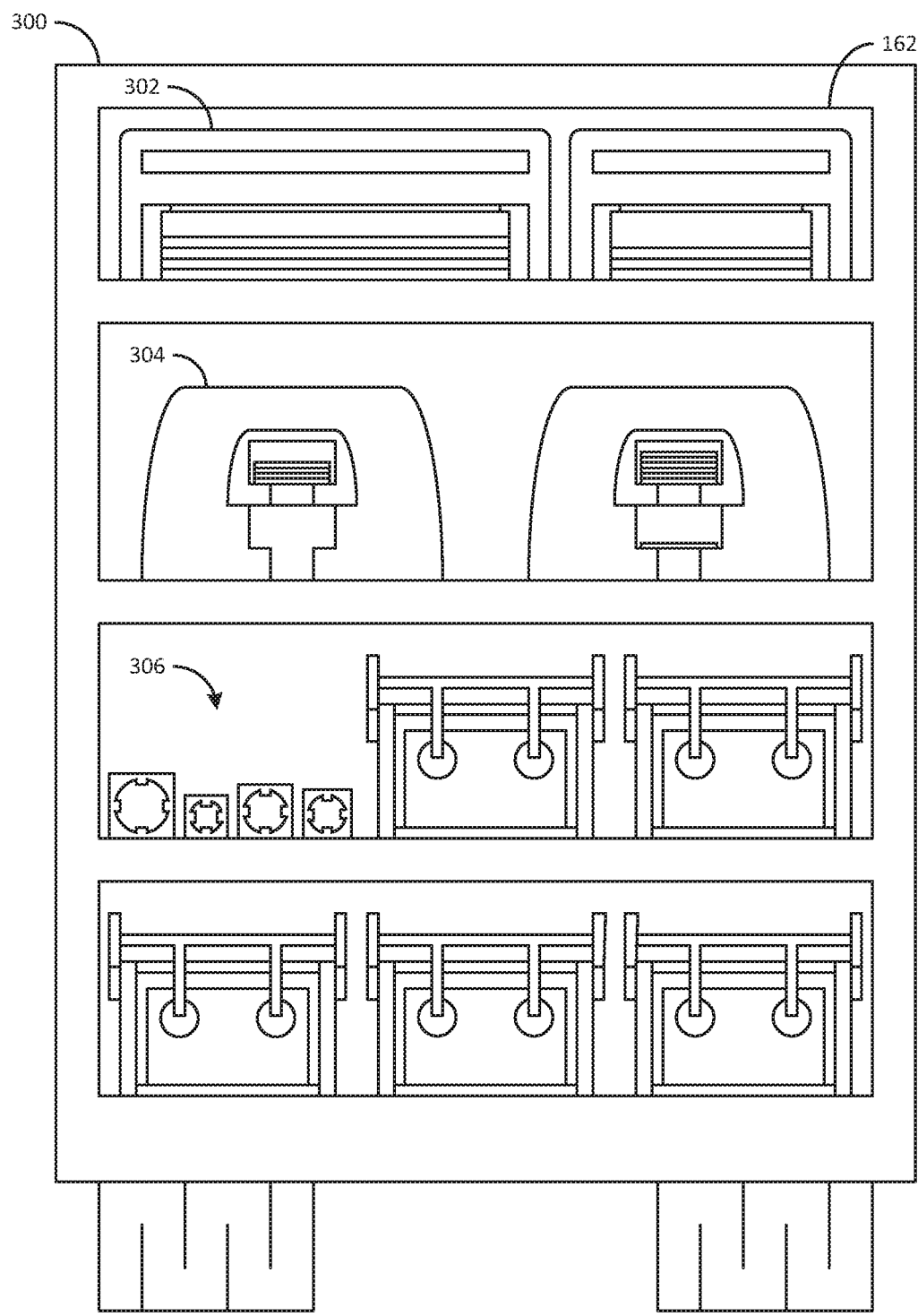
FIG. 3 illustrates a robotic device included in a lockbox feeder system, according to an example embodiment.

Referring now to FIG. 3, a front view of a robotic device 300 used as part of the feeder system 108 is shown, according to an exemplary embodiment. The robotic device 300 includes several secure compartments 162 within the body of the robotic device 300. The secure compartments 162 contain various materials that can be used to fulfill pick-up requests. For example, in the embodiment of FIG. 3, the robotic device 300 includes document printers 302, card printers 304 (e.g., for printing payment cards, identification cards), and currency dispensers 306. However, it should be understood that in other embodiments, the robotic device 300 includes different and/or additional materials and components that can be used to fulfill pick-up requests, such as identification fobs, chips for payment instruments, and so on. Alternatively, in some embodiments, the feeder system 108 includes multiple robotic devices 300, each including one type or a few types of material(s) or component(s) that can be used to fulfill pick-up requests.

The robotic device 300 is accordingly used to fulfill pick-up requests by organizing or generating the requested item(s) and depositing the item(s) in the lockbox 112 for the pick-up. As an illustration, the feeder system 108 instructs the robotic device 300 shown in FIG. 3 to drive to the lockbox 112 and print and/organize the necessary item(s). The feeder system 108 then opens the lockbox 112 (e.g., a back panel of the lockbox 112) and the secure compartments 162 of the robotic device 300 (e.g., by unlocking and sliding away a front panel (not shown) from the robotic device 300) and instructs the robotic device to deposit the item(s) in the lockbox 112. For example, the robotic device 300 pushes the item(s) into the lockbox 112 or uses a robotic arm (not shown) to move the item(s) into the lockbox 112. The feeder system 108 then relocks the secure compartments 162 of the robotic device 300 and the lockbox 112.

Figure 4:
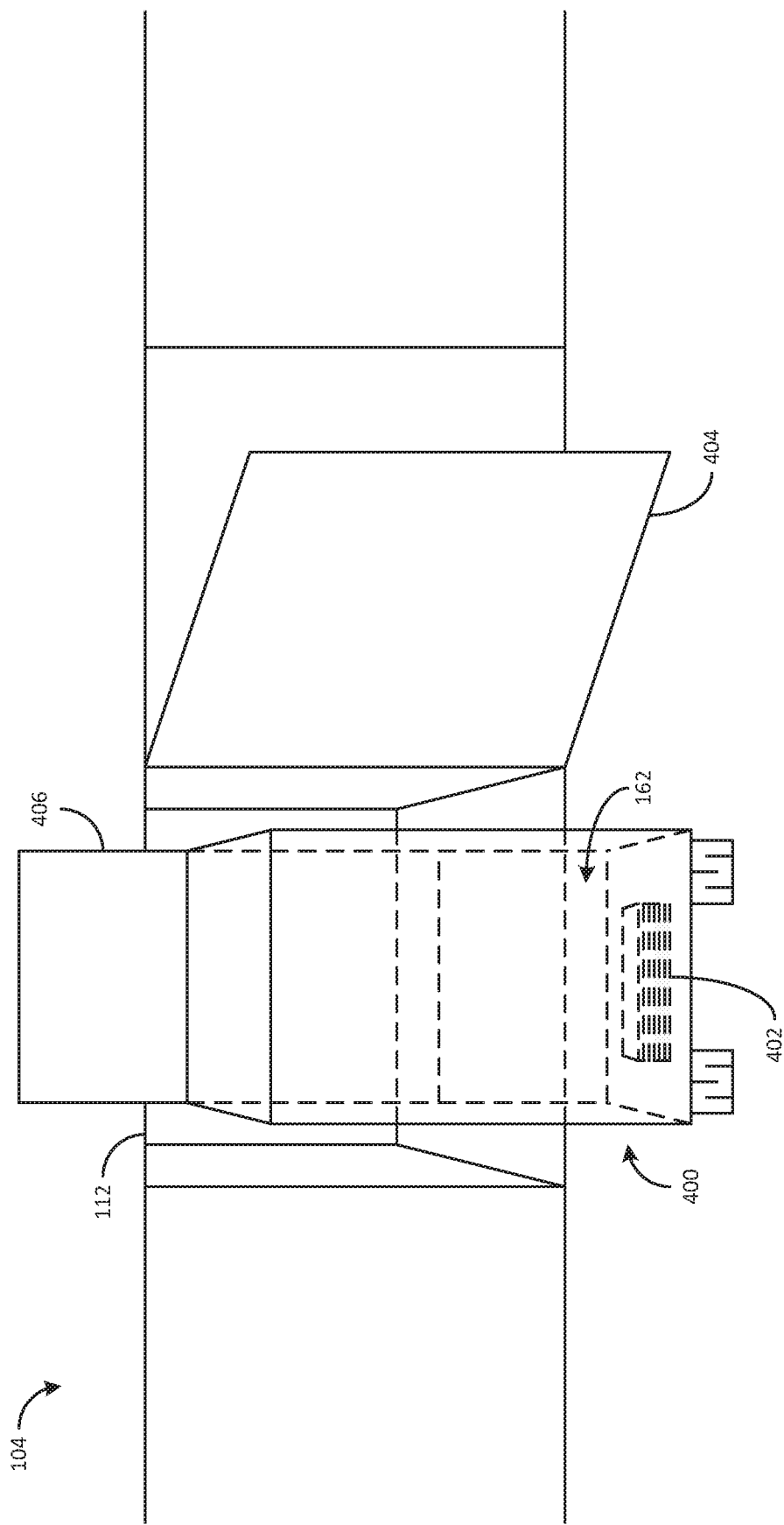
FIG. 4 illustrates a robotic device included in a lockbox feeder system in use, according to an example embodiment.

Referring now to FIG. 4, a perspective view of a robotic device 400 used in the feeder system 108 is shown in use fulfilling a pick-up request, according to an exemplary embodiment. As shown in FIG. 4, the robotic device 400 includes currency 402 that the robotic device 400 is delivering to a lockbox 112 in a lockbox bank 104. For example, the robotic device 400 has been loaded with the currency 402 through a currency dispenser, through a storage locker containing currency, or by a human worker. The robotic device 400 has then been driven to the lockbox bank 104, as shown in FIG. 4. A back panel 404 of the lockbox 112 has been opened for the robotic device 400, and a front panel 406 of the robotic device 400 has also been opened to expose the secure compartment 162 inside the robotic device 400. The robotic device 400 can then transfer the currency 402 to the lockbox 112 (e.g., by docking to the lockbox 112 and pushing the currency 402 inside the lockbox 112, by pushing a bottom tray forming the bottom of the secure compartment 162 into the lockbox 112).

Figure 5:
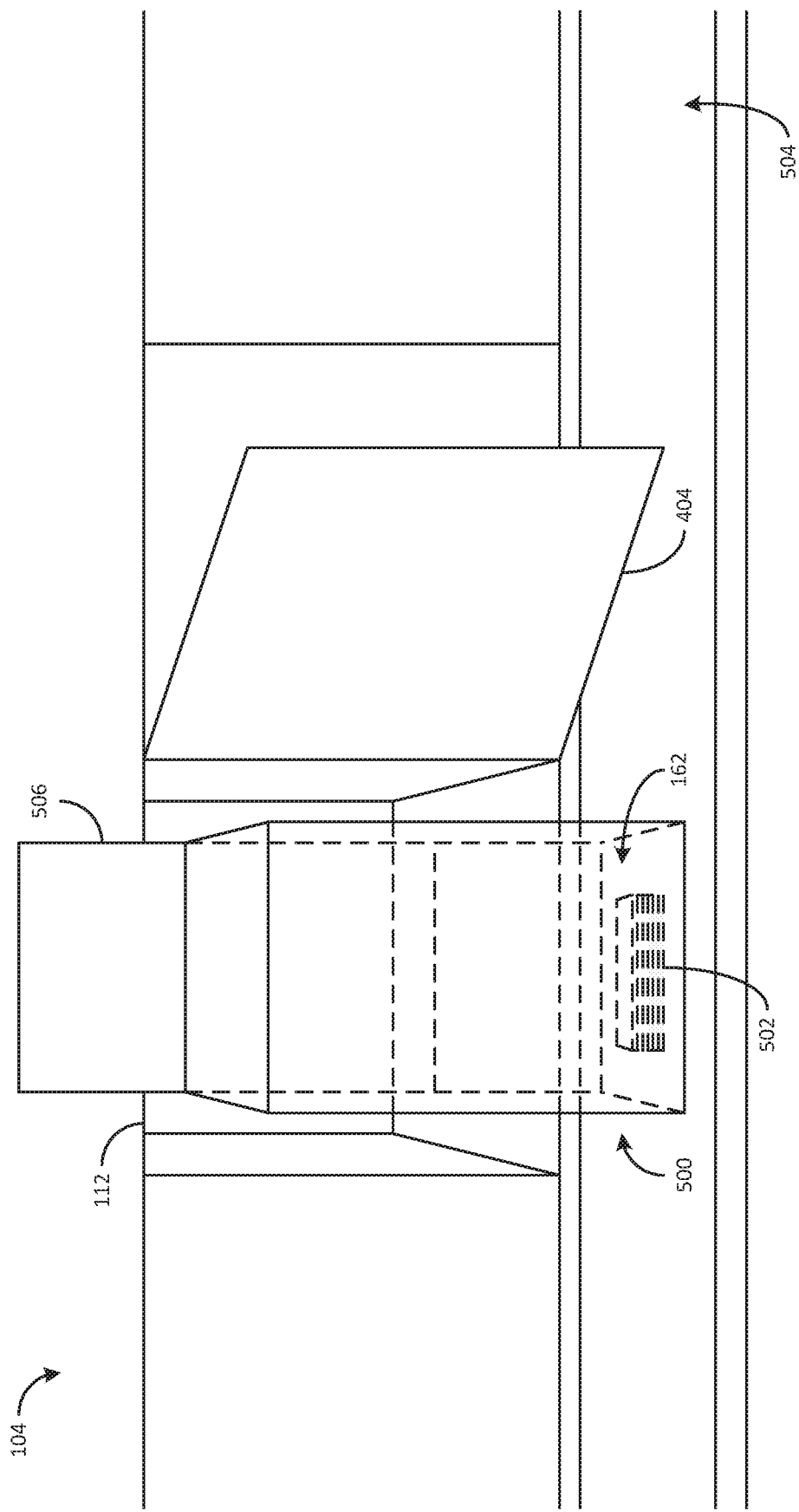
FIG. 5 illustrates a robotic device included in a lockbox feeder system in use, according to another example embodiment.

Referring now to FIG. 5, a perspective view of a robotic device 500 used in the feeder system 108 is shown in use fulfilling a pick-up request, according to an exemplary embodiment. Similar to the robotic device 400, the robotic device 500 includes currency 502 that the robotic device 500 is delivering to a lockbox 112 in a lockbox bank 104. However, unlike the robotic device 400, the robotic device 500 has been moved to the lockbox 112 via a track or conveyor belt 504. For example, the feeder system 108 has loaded the robotic device 500 with the currency 502 by moving the track 504 such that the robotic device 500 was moved to a secure locker containing the currency 502, which the secure locker delivered into the secure compartment 162 of robotic device 500. Then the feeder system 108 moved the track 504 such that the robotic device 500 was aligned with the lockbox 112, as shown in FIG. 5. The feeder system 108 has also opened the back panel 404 of the lockbox 112 and a front panel 506 of the robotic device 500 such that the robotic device 500 can transfer the currency to the lockbox 112 (e.g., by pushing a bottom tray forming the bottom of the secure compartment 162 into the lockbox 112). It should be understood, however, the FIGS. 4 and 5 are intended to be exemplary and that other configurations of the feeder system 108 may be used in other embodiments.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud-based processor). Alternatively, or additionally, the one or more processors are internal and/or local to the apparatus. Accordingly, an exemplary system for implementing the overall system or portions of the embodiments might include general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon. Thus, in these arrangements, personal information about the user of the device, financial data, and other types of data is encrypted and transmitted to prevent or substantially prevent the threat of hacking.

In certain embodiments, an "input/output device" as used herein includes hardware and associated logics configured to enable a party to exchange information with a computing device to which the input/output device is connected. In various embodiments, an input aspect of an input/output device allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output device allows a party to receive information from the computing device and includes, for example, a display, a printer, a speaker, illuminating icons, LEDs, an output device engageable to the computing device via a USB, wirelessly, and so on, or any other type of output device capable of being used with a computing device.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another, or with the two members or the two members and any additional intermediate members being attached to one another. Such joining may be permanent in nature or may be removable or releasable in nature.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. A feeder system for fulfilling lockbox pick-up requests, comprising:
    a network interface configured to communicate with a computing system associated with a provider of lockbox services;
    at least one robotic device, each robotic device comprising at least one secure compartment configured to hold one or more items associated with a lockbox pick-up request;
    at least one of a moving track or a moving conveyor belt configured to move the at least one robotic device to a lockbox selected for the lockbox pick-up request; and
    a processing circuit comprising a processor and a memory, the memory structured to store instructions that are executable by the processor and cause the processing circuit to:
        receive, by the network interface, instructions for fulfilling the lockbox pick-up request;
        control the at least one robotic device to fulfill the lockbox pick-up request based on the instructions;
        move, by the at least one of the moving track or the moving conveyor belt, the at least one robotic device to the lockbox; and
        deliver, by the at least one robotic device, the one or more items associated with the lockbox pick-up request into the lockbox by pushing the one or more items into the lockbox via a robotic arm.

2. The feeder system of claim 1, wherein each robotic device comprises at least one of a currency dispenser, a document printer, or a card printer in the at least one secure compartment.

3. The feeder system of claim 1, further comprising one or more storage lockers comprising at least one of a currency dispenser, a document printer, or a card printer.

4. The feeder system of claim 1, wherein each robotic device is configured to dock with a lockbox.

5. The feeder system of claim 1, wherein each robotic device is configured to dock with another robotic device.

6. The feeder system of claim 1, wherein the instructions further cause the processing circuit to generate a log of actions taken to fulfill the lockbox pick-up request.

7. A method of fulfilling a lockbox pick-up request, comprising:
    providing a feeder system comprising at least one robotic device and at least one of a moving track or a moving conveyor belt, each robotic device comprising at least one secure compartment configured to hold one or more items associated with a lockbox pick-up request the at least one of the moving track or the moving conveyor belt configured to move the at least one robotic device to a lockbox selected for the lockbox pick-up request;
    receiving instructions for fulfilling the lockbox pick-up request;
    controlling the at least one robotic device to fulfill the lockbox pick-up request based on the instructions;
    moving, by the at least one of the moving track or the moving conveyor belt, the at least one robotic device to the lockbox; and
    delivering, by the at least one robotic device, the one or more items associated with the lockbox pick-up request into the lockbox by pushing the one or more items into the lockbox via a robotic arm.

8. The method of claim 7, wherein each robotic device comprises at least one of a currency dispenser, a document printer, or a card printer in the at least one secure compartment.

9. The method of claim 7, wherein the feeder system further comprises one or more storage lockers comprising at least one of a currency dispenser, a document printer, or a card printer.

10. The method of claim 7, wherein each robotic device is configured to dock with a lockbox.

11. The method of claim 7, wherein each robotic device is configured to dock with another robotic device.

12. The method of claim 7, further comprising generating a log of actions taken to fulfill the lockbox pick-up request.

13. A lockbox system, comprising:
    a bank of one or more lockboxes, each lockbox comprising a receptacle and locking mechanism; and
    a feeder system, comprising:
        a network interface configured to communicate with a computing system associated with a provider of lockbox services;
        one or more robotic devices, each robotic device comprising at least one secure compartment configured to hold one or more items associated with a lockbox pick-up request;
        at least one of a moving track or a moving conveyor belt configured to move the at least one robotic device to a lockbox of the bank of one or more lockboxes selected for the lockbox pick-up request; and
        a processing circuit comprising a processor and a memory, the memory structured to store instructions that are executable by the processor and cause the processing circuit to:
            receive, by the network interface, instructions for fulfilling the lockbox pick-up request;
            control the one or more robotic devices to fulfill the lockbox pick-up request based on the instructions;
            move, by the at least one of the moving track or the moving conveyor belt, the at least one robotic device to the lockbox; and
            deliver, by the at least one robotic device, the one or more items associated with the lockbox pick-up request into the lockbox by pushing the one or more items into the lockbox via a robotic arm.

14. The lockbox system of claim 13, wherein each robotic device comprises at least one of a currency dispenser, a document printer, or a card printer in the at least one secure compartment.

15. The lockbox system of claim 13, wherein the feeder system further comprises one or more storage lockers comprising at least one of a currency dispenser, a document printer, or a card printer.

16. The lockbox system of claim 13, wherein each robotic device is configured to dock with a lockbox.

17. The lockbox system of claim 16, wherein the bank of one or more lockboxes comprises at least one lockbox in a first shape and at least one lockbox in a second shape; and
   wherein the one or more robotic devices comprise at least one robotic device shaped to dock with the first shape of lockbox and at least one robotic device shaped to dock with the second shape of lockbox.

18. The lockbox system of claim 13, wherein each robotic device is configured to dock with another robotic device.

19. The lockbox system of claim 13, wherein the instructions further cause the processing circuit to generate a log of actions taken to fulfill the lockbox pick-up request.

20. The lockbox system of claim 13, wherein each lockbox further comprises a back panel accessible by the one or more robotic devices and through which the one or more robotic devices deliver the one or more items to the lockbox.

\* \* \* \* \*